US 6,715,406 B2

(12) United States Patent
Chang

(10) Patent No.: US 6,715,406 B2
(45) Date of Patent: Apr. 6, 2004

(54) COFFEE MAKER

(76) Inventor: Kwei Tang Chang, No. 14, Lane 54, Luong Chuan St., Panchiao City, Taipei Hsien (TW)

( * ) Notice: Subject to any disclaimer, the term of this patent is extended or adjusted under 35 U.S.C. 154(b) by 14 days.

(21) Appl. No.: 10/136,372

(22) Filed: May 2, 2002

(65) Prior Publication Data

US 2003/0205146 A1 Nov. 6, 2003

(51) Int. Cl.[7] .................... A47J 31/00; A47J 31/053
(52) U.S. Cl. ................................... 99/312; 99/308
(58) Field of Search ...................... 99/308, 310, 312, 99/303

(56) References Cited

U.S. PATENT DOCUMENTS 2,701,296 A * 2/1955 Crawford ..................... 99/308
3,270,659 A * 9/1966 Tavera ........................ 99/308

* cited by examiner

Primary Examiner—Reginald L. Alexander

(57) ABSTRACT

A coffee maker comprises a base, a main body, a filter unit, a sprinkling unit, and an upper cover. Mortises, a positioning groove, and a lower socket are disposed at the top and two sides of the base, respectively. The mortises, the positioning groove, and the lower socket correspond to tenons, a positioning post, and an upper socket at the lower portion of the main body to facilitate connection, dismantlement, and cleaning of the base and the main body. A transparent window is disposed at the front side of the main body, and an inner glass container is disposed in the main body. The filter unit and the sprinkling unit are received in the inner glass container. Through the transparent window and the inner glass container, one can view the situation of brewing coffee in the inner glass container, hence enhancing the fun of brewing coffee.

9 Claims, 5 Drawing Sheets

COFFEE MAKER

FIELD OF THE INVENTION

The present invention relates to a coffee maker and, more particularly, to a novel coffee maker, which can enhance the fun of brewing coffee, and can be cleaned conveniently after use.

BACKGROUND OF THE INVENTION

Nowadays, cafes stand in great numbers, and the rich fragrance generated when brewing coffee extremely attracts most people. Therefore, more and more people form a habit of drinking coffee. There are many appliances for brewing coffee in the market, e.g., distillation type electric products or glass appliances utilizing the siphonal principle.

However, because it is necessary to burn fuel gas when using a glass appliance to brew coffee, hazards may easily arise. On the other hand, the distillation type electric product has a larger volume and is hard to clean.

Accordingly, the above two kinds of coffee makers have inconvenience and drawbacks in practical installation and use. The present invention aims to resolve the problems in the prior art.

SUMMARY OF THE INVENTION

The primary object of the present invention is to provide a novel coffee maker, which utilizes mortises and tenons to accomplish easy connection and dismantlement so that the coffee maker can be conveniently cleaned after use.

Another object of the present invention is to provide a coffee maker, which utilizes a transparent window and an inner glass container so that the situation of brewing coffee can be viewed, thereby enhancing the fun of brewing coffee.

To achieve the above objects, the present invention provides a coffee maker, which comprises a base, a main body, a filter unit, a sprinkling unit, and an upper cover. Mortises, a positioning groove, and a lower socket are disposed at the top and two sides of the base, respectively. The mortises, the positioning groove, and the lower socket correspond to tenons, a positioning post, and an upper socket at the lower portion of the main body to facilitate the connection, dismantlement, electric conduction, and cleaning.

The present invention is also characterized in that a transparent window is disposed at the front side of the main body and an inner glass container is disposed inside the main body. One can view the situation of brewing coffee in the inner glass container to enhance the fun of brewing coffee.

The various objects and advantages of the present invention will be more readily understood from the following detailed description when read in conjunction with the appended drawing, in which:

DETAILED DESCRIPTION OF THE PREFERRED EMBODIMENTS

Figure 1:
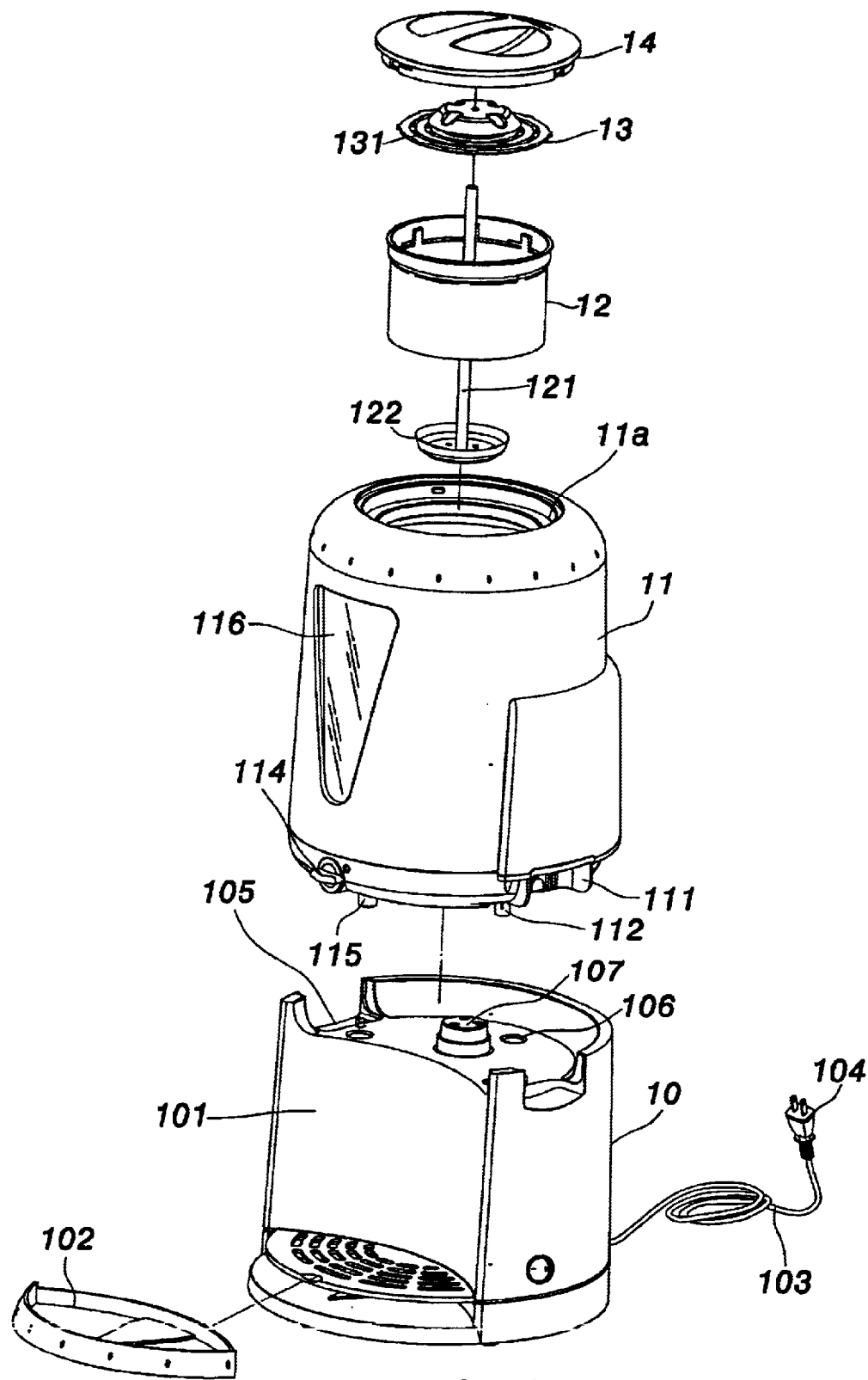
FIG. 1 is an exploded perspective view of the present invention.
Figure 2:
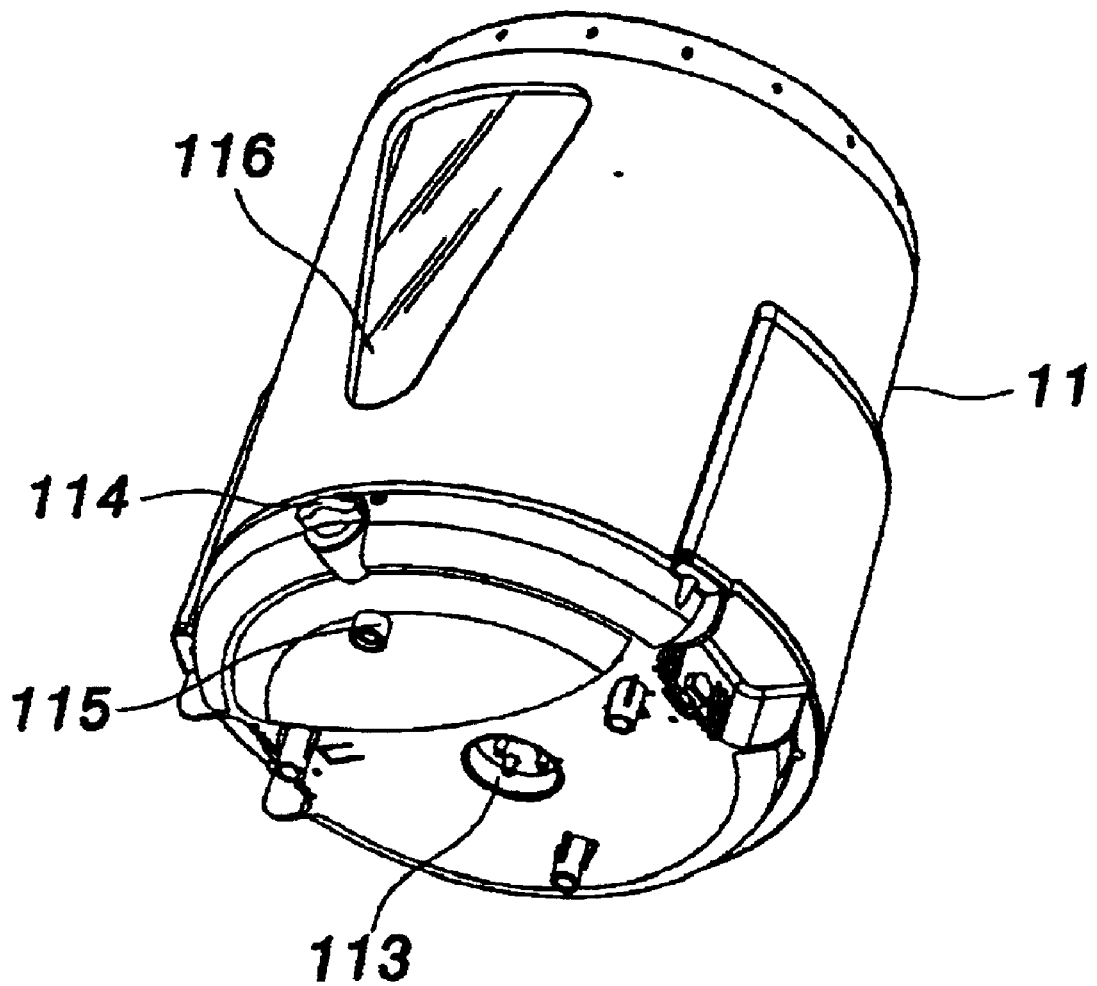
FIG. 2 is a perspective view of the main body of the present invention.

As shown in FIGS. 1 to 5, the present invention provides a coffee maker, which comprises a base 10, a main body 11, a filter unit 12, a sprinkling unit 13, and an upper cover 14. The coffee maker of the present invention can enhance the fun of brewing coffee, and can be cleaned more conveniently after use.

A gap 101 is formed at the front edge of the base 10 to facilitate placement of a coffee cup (not shown). A basin 102 of easy dismantlement and cleaning is joined below the base 10. The basin 102 is used to avoid smears formed after coffee drops.

One side of the base 10 is connected to one end of an electric cable 103. The other end of the electric cable 103 forms a plug 104, which is plugged into a receptacle (not shown) to facilitate electric power transmission. A reel (not shown) can be disposed inside the base to facilitate retraction of the electric cable 103 and enhance convenience of use.

Figure 3:
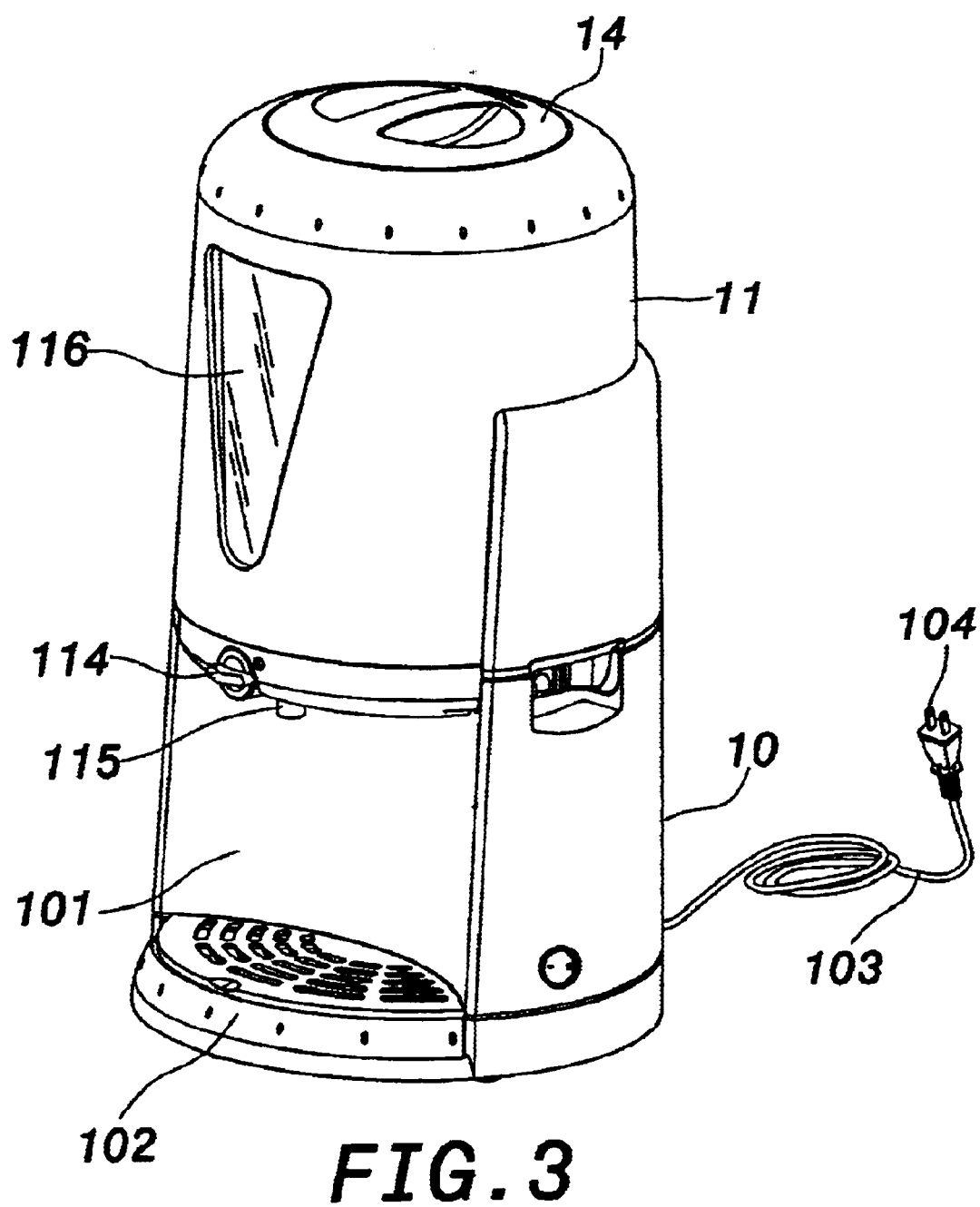
FIG. 3 is a perspective assembly view of the present invention.

Mortises 105, a positioning groove 106, and a lower socket 107 are disposed at the top and two sides of the base 10, respectively. The mortises 105, the positioning groove 106, and the lower socket 107 correspond to tenons 111, a positioning post 112, and an upper socket 113 shown in FIG. 2 at the lower portion of the main body 11 to facilitate firm connection and electric conduction of the base 10 and the main body 11, as shown in FIG. 3.

A knob 114 and an outlet 115 are disposed at one side of the lower portion of the main body 11. The knob 114 and the outlet 115 are exactly above the gap 101 of the base 10 and the basin 102 joined on the base 10. The knob 114 is used to control whether brewed coffee in the main body 11 can flow out from the outlet 115. One can place a coffee cup in the gap 101 and control the knob 114 to take coffee flowing out from the outlet 115.

Figure 4:
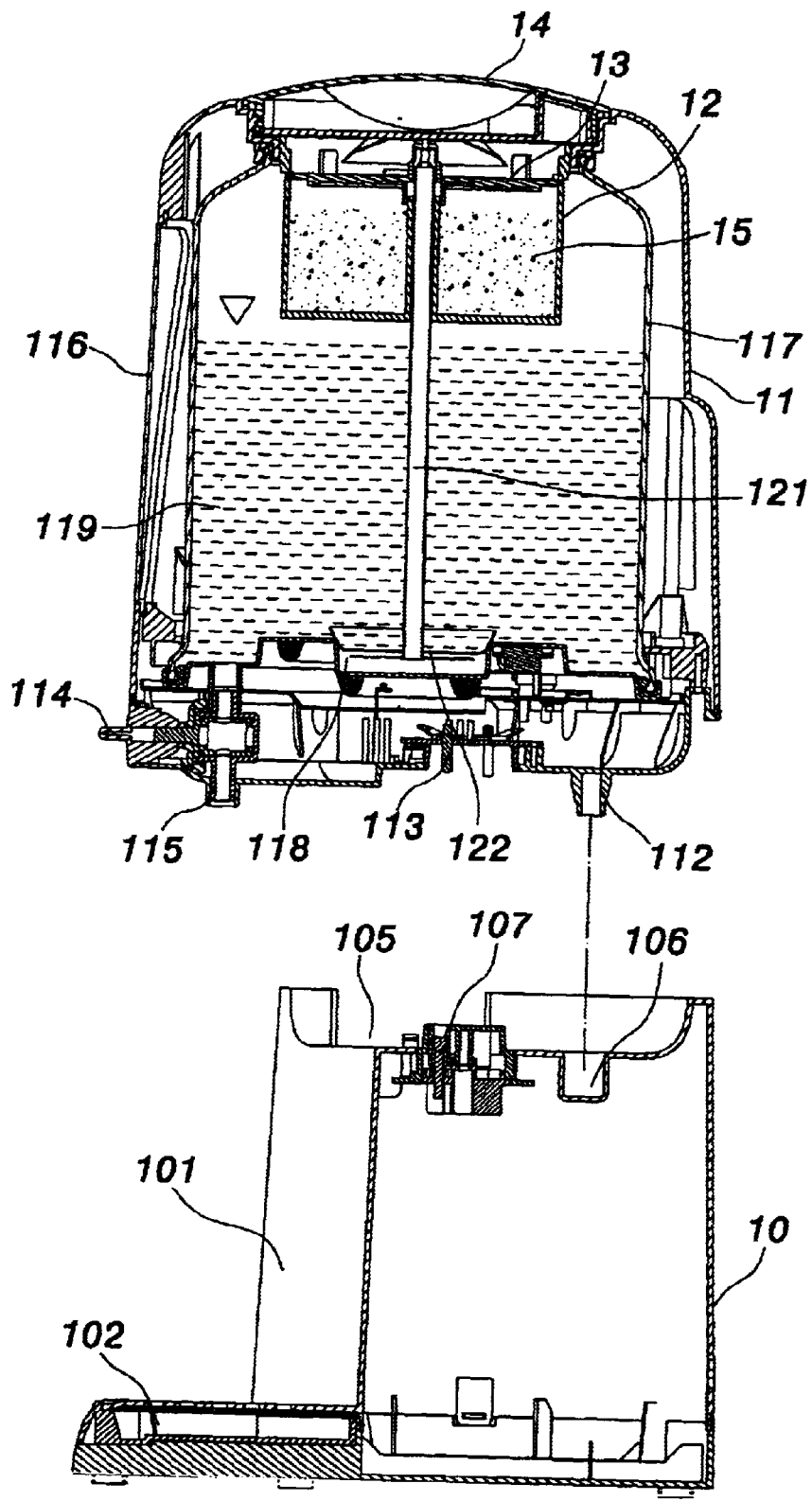
FIG. 4 is a cross-sectional view of the present invention.

A transparent window 116 is disposed at the front side of the main body 11. An inner glass container 117 is disposed in the main body 11, as shown in FIG. 4. One can view the situation of brewing coffee in the inner glass container 116 through the transparent window 116, hence enhancing the fun of brewing coffee.

Figure 5:
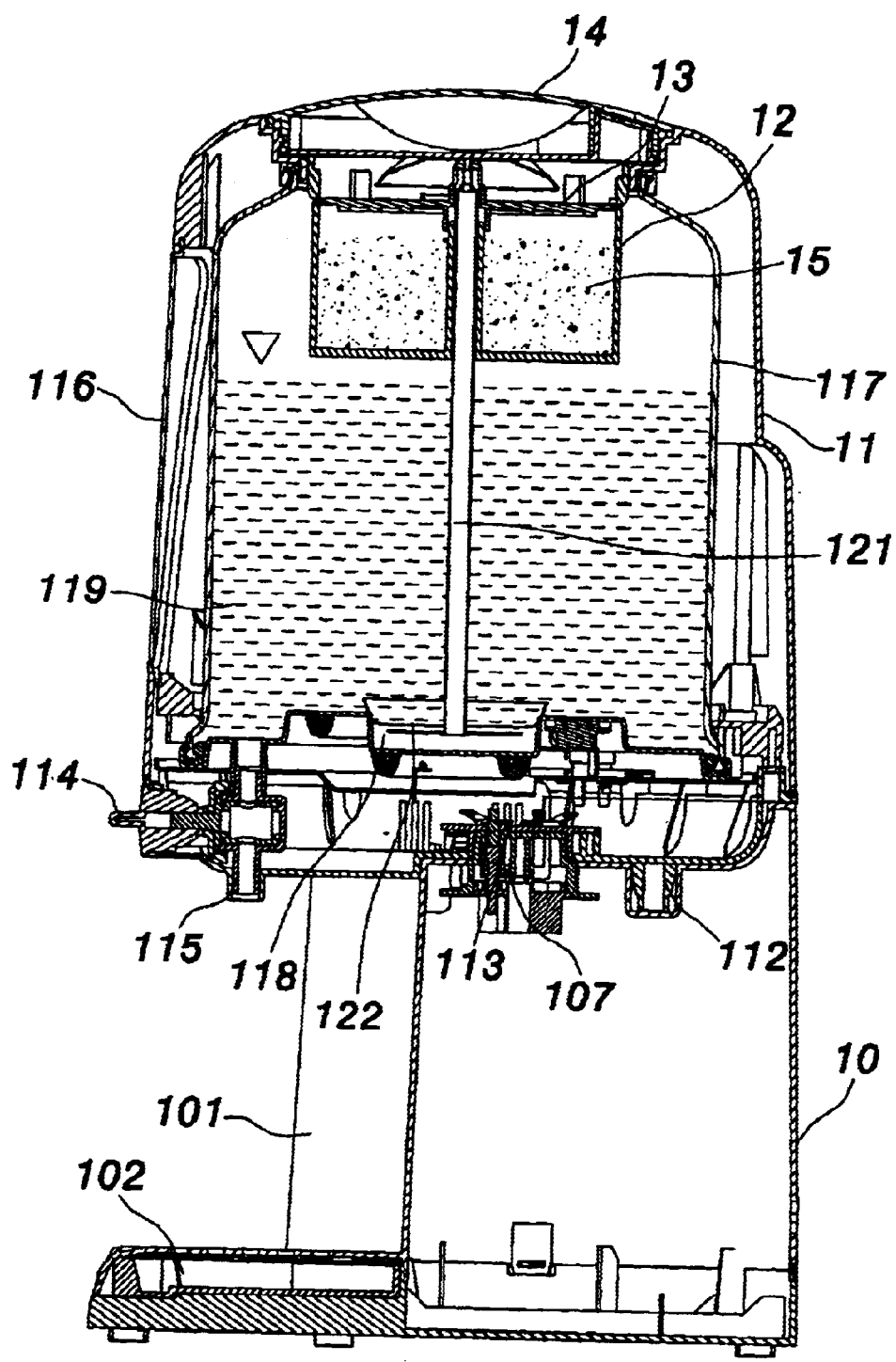
FIG. 5 is another cross-sectional view of the present invention.

The filter unit 12 and the sprinkling unit 13 are received in the inner glass container 117, as shown in FIG. 5. The upper cover 14 covers a groove 11a at the top of the main body 11. The filter unit 12 is plugged with a stainless pipe 121, which can suck fluid 119 (e.g., water) received in the inner glass container 117 by means of siphonal principle, as shown in FIG. 4. The bottom end of the stainless pipe 121 is connected to a positioning disk 122, which can be joined with a recessed portion 118 formed at the bottom of the inner glass container 117 (as shown in FIG. 5) so that the whole filter unit 12 can be firmly positioned in the inner glass container 117.

The filter unit 12 is used to receive coffee powder 15, as shown in FIG. 4. The filter unit 12 is a reticulum. The top end of the stainless pipe 121 is connected to the sprinkling unit 13. Several small holes 131 are distributed on the sprinkling unit 13. These small holes 131 are used for uniform sprinkling of the fluid 119 sucked by the stainless pipe 121 into the filter unit 12. Thereby, the coffee powder 15 received in the filter unit 12 can be adequately brewed and then flow into the inner glass container 117 through the filter unit 12 to let the fluid 119 form coffee of rich fragrance.

To sum up, the coffee maker of the present invention has at least the following advantages.

1. The basin 102 of easy dismantlement and cleaning is joined below the base 10 to avoid smears formed after coffee drops.
2. The mortises 105 of the base 10 are joined with the tenons 111 of the main body 11 to facilitate dismantlement of the base 10 and the main body, hence achieving the object of easy cleaning.
3. The transparent window 116 is disposed at the front side of the main body 11, and the inner glass container 117 is disposed in the main body 11 so that one can view the situation of brewing coffee, thereby enhancing the fun of brewing coffee.
4. A reel can be disposed in the base 10 to facilitate retraction of the electric cable 103 and enhance convenience of use.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A coffee maker, comprising:

a base with mortises disposed at an upper portion thereof;

a main body with tenons disposed at a lower portion thereof, said tenons being retained with said mortises of said base, an inner glass container being disposed in said main body, a knob and an outlet being disposed at an outer portion of said main body, a groove being disposed at a top portion of said main body;

a filter unit received in said inner glass container in said main body, said filter unit being plugged with a stainless pipe, said stainless pipe being used to suck liquid received in said inner glass container;

a sprinkling unit received in said inner glass container in said main body; and an upper cover covering said groove at the top portion of said main body.

2. The coffee maker as claimed in claim 1, wherein a gap is formed at a front edge of said base to receive a coffee cup.

3. The coffee maker as claimed in claim 1, wherein a basin of easy dismantlement and cleaning is joined below said base.

4. The coffee maker as claimed in claim 1, further comprising a power cable retractably connected to said base.

5. The coffee maker as claimed in claim 1, wherein a positioning groove and a lower socket are disposed at a top portion of said base, and said positioning groove and said lower socket are connected with a positioning post and an upper socket disposed at a lower portion of said main body.

6. The coffee maker as claimed in claim 1, wherein a transparent window is disposed at a front side of said main body so that one can view the situation of brewing coffee in said inner glass container.

7. The coffee maker as claimed in claim 1, wherein a recessed portion is disposed at a bottom portion of said inner glass container in said main body, and said recessed portion is used to position a bottom end of said stainless pipe.

8. The coffee maker as claimed in claim 1, wherein said filter unit is a reticulum.

9. The coffee maker as claimed in claim 1, wherein several small holes are distributed on said sprinkling unit, and said small holes are used for uniform sprinkling of said fluid sucked by said stainless pipe into said filter unit.

* * * * *